United States Patent
Aaron

(10) Patent No.: US 10,271,164 B2
(45) Date of Patent: *Apr. 23, 2019

(54) DEVICE, SYSTEM AND METHOD FOR RECORDING PERSONAL ENCOUNTER HISTORY

(71) Applicant: AT&T Intellectual Property I, L.P., Atlanta, GA (US)

(72) Inventor: Jeffrey A. Aaron, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 54 days.

This patent is subject to a terminal disclaimer.

(21) Appl. No.: 15/276,110

(22) Filed: Sep. 26, 2016

(65) Prior Publication Data

US 2017/0013410 A1 Jan. 12, 2017

Related U.S. Application Data

(63) Continuation of application No. 14/681,836, filed on Apr. 8, 2015, now Pat. No. 9,456,051, which is a
(Continued)

(51) Int. Cl.
*H04L 29/06* (2006.01)
*G06F 21/00* (2013.01)
(Continued)

(52) U.S. Cl.
CPC ......... *H04W 4/023* (2013.01); *H04L 65/403* (2013.01); *H04L 67/24* (2013.01); *H04L 67/306* (2013.01);
(Continued)

(58) Field of Classification Search
CPC ..... H04W 4/028; H04W 4/023; H04W 12/02; H04W 8/26; H04L 67/24; H04L 67/306;
(Continued)

(56) References Cited

U.S. PATENT DOCUMENTS 4,853,628 A 8/1989 Gouldsberry et al.
5,505,057 A 4/1996 Sato et al.
(Continued)

FOREIGN PATENT DOCUMENTS

WO WO 2006000528 1/2006

OTHER PUBLICATIONS

Huang et al., "A Self-Adaptive Zone Routing Protocol for Bluetooth Scatternets," Aug. 26, 2004.
(Continued)

*Primary Examiner* — Lisa C Lewis
(74) *Attorney, Agent, or Firm* — Hartman & Citrin LLC

(57) ABSTRACT

Provided are exemplary embodiments including a method for creating and using a personal encounter history using a communication device. The method involves the communication device receiving the transmission of a pseudo identifier from a proximal communication device where the pseudo identifier is associated with the user of the proximal communication device. Once received, the method continues with the wireless communication device requesting and receiving the actual identification of the user of the proximal communication device that is correlated with the pseudo identifier. The communication device includes a transceiver capable of communicating wirelessly with a mobile telecommunications network, a memory device and a processor. To ensure privacy, the processor is capable of receiving a pseudo identifier from a proximate communication device and then requesting an actual identification correlated with the pseudo identifier of the proximate communication device.

20 Claims, 8 Drawing Sheets

421

| Record # | Encounter | Location | Temperature °F |
|---|---|---|---|
| 56 | sweet_baby_james | Airport | 76 |
| 100 | Randy Smith—ABD Inc. | Sales Convention | 70 |
| 1 | jhfvh09ucv0pu0eq | Lat 33.6499 Lng 84.4200 | 92 |
| 15 | jccfuv9-uf-0uv-u | Lat 33.6500 Lng 84.4201 | 92 |
| 30 | mnceq09uf3-9pojv | Lat 33.6500 Lng 84.4199 | 92 |
| 60 | mj vds-ui4w-iuff | Lat 33.6501 Lng 84.4199 | 95 |

610 620 630 640 670

Related U.S. Application Data continuation of application No. 14/024,325, filed on Sep. 11, 2013, now Pat. No. 9,015,492, which is a continuation of application No. 11/611,475, filed on Dec. 15, 2006, now Pat. No. 8,566,602.

(51) Int. Cl.

| | | |
|---|---|---|
| *H04W 4/02* | (2018.01) | |
| *H04M 1/725* | (2006.01) | |
| *H04L 29/08* | (2006.01) | |
| *H04W 4/029* | (2018.01) | |
| *H04W 8/26* | (2009.01) | |
| *H04W 12/02* | (2009.01) | |

(52) U.S. Cl.
CPC ....... *H04M 1/72566* (2013.01); *H04W 4/029* (2018.02); *H04L 63/0414* (2013.01); *H04M 1/7253* (2013.01); *H04M 1/72572* (2013.01); *H04M 2250/10* (2013.01); *H04M 2250/12* (2013.01); *H04M 2250/60* (2013.01); *H04W 8/26* (2013.01); *H04W 12/02* (2013.01)

(58) Field of Classification Search
CPC .............. H04L 65/403; H04L 63/0414; H04M 1/72566; H04M 2250/10; H04M 1/7253; H04M 2250/60; H04M 2250/12; H04M 1/72572

See application file for complete search history.

(56) References Cited

U.S. PATENT DOCUMENTS

| | | | |
|---|---|---|---|
| 5,812,932 A | 9/1998 | Wiedeman et al. | |
| 6,130,707 A | 10/2000 | Koller et al. | |
| 6,567,835 B1 | 5/2003 | Blomgren et al. | |
| 6,580,914 B1 | 6/2003 | Smith | |
| 6,587,835 B1 | 7/2003 | Treyz et al. | |
| 6,681,108 B1* | 1/2004 | Terry | G06Q 10/10 |
| | | | 340/5.1 |
| 6,754,665 B1 | 6/2004 | Futagami et al. | |
| 6,853,628 B2 | 2/2005 | Chitrapu | |
| 6,892,217 B1 | 5/2005 | Hanmann et al. | |
| 6,912,398 B1 | 6/2005 | Domnitz | |
| 6,947,976 B1 | 9/2005 | Devitt et al. | |
| 6,977,997 B2 | 12/2005 | Shioda et al. | |
| 7,046,987 B2 | 5/2006 | Siegel et al. | |
| 7,109,859 B2 | 9/2006 | Peeters | |
| 7,136,658 B2 | 11/2006 | Cole et al. | |
| 7,136,688 B2 | 11/2006 | Jung et al. | |
| 7,155,238 B2 | 12/2006 | Katz | |
| 7,271,720 B2 | 9/2007 | Tabe | |
| 7,324,959 B2 | 1/2008 | Malkin et al. | |
| 7,356,347 B1 | 4/2008 | Kammer | |
| 7,554,441 B2 | 6/2009 | Viegers et al. | |
| 7,570,943 B2 | 8/2009 | Sorvari et al. | |
| 7,599,795 B1 | 10/2009 | Blumberg et al. | |
| 7,634,228 B2 | 12/2009 | White et al. | |
| 7,646,297 B2 | 1/2010 | Aaron | |
| 7,738,898 B2 | 6/2010 | Aaron | |
| 7,781,666 B2 | 8/2010 | Nishitani et al. | |
| 7,804,980 B2 | 9/2010 | Sasaki | |
| 7,996,514 B2* | 8/2011 | Baumert | G06F 21/35 |
| | | | 709/203 |
| 8,089,355 B2 | 1/2012 | Aaron | |
| 8,103,247 B2* | 1/2012 | Ananthanarayanan | |
| | | | H04W 12/04 |
| | | | 455/410 |
| 8,160,548 B2 | 4/2012 | Aaron | |
| 8,199,003 B2 | 6/2012 | Aaron | |
| 8,335,504 B2 | 12/2012 | Aaron | |
| 8,493,208 B2 | 7/2013 | Aaron | |
| 8,787,884 B2 | 7/2014 | Aaron | |
| 2002/0082931 A1 | 6/2002 | Siegel et al. | |
| 2002/0095333 A1 | 7/2002 | Jokinen et al. | |
| 2002/0101993 A1* | 8/2002 | Eskin | G01S 1/68 |
| | | | 380/270 |
| 2002/0147928 A1 | 10/2002 | Mahajan et al. | |
| 2002/0178385 A1 | 11/2002 | Dent et al. | |
| 2002/0184418 A1* | 12/2002 | Blight | G01C 21/20 |
| | | | 710/100 |
| 2003/0006913 A1 | 1/2003 | Joyce et al. | |
| 2003/0008661 A1 | 1/2003 | Joyce et al. | |
| 2003/0050039 A1 | 3/2003 | Baba et al. | |
| 2003/0060240 A1 | 3/2003 | Graham et al. | |
| 2003/0198204 A1 | 10/2003 | Taneja et al. | |
| 2004/0032503 A1 | 2/2004 | Monden et al. | |
| 2004/0078372 A1* | 4/2004 | Huuskonen | G06Q 10/109 |
| 2004/0082351 A1 | 4/2004 | Westman | |
| 2004/0092269 A1 | 5/2004 | Kivinen | |
| 2004/0110515 A1 | 6/2004 | Blumberg et al. | |
| 2004/0122803 A1* | 6/2004 | Dom | G06F 17/30867 |
| 2004/0141606 A1 | 7/2004 | Torvinen | |
| 2004/0209602 A1 | 10/2004 | Joyce | |
| 2005/0073406 A1 | 4/2005 | Easley et al. | |
| 2005/0075116 A1 | 4/2005 | Laird et al. | |
| 2005/0107037 A1* | 5/2005 | Delmulle | H04L 63/0421 |
| | | | 455/41.2 |
| 2005/0113123 A1 | 5/2005 | Torvinen | |
| 2005/0117516 A1 | 6/2005 | Yang | |
| 2005/0149443 A1 | 7/2005 | Torvinen | |
| 2005/0153729 A1 | 7/2005 | Logan et al. | |
| 2005/0176420 A1 | 8/2005 | Graves | |
| 2005/0181824 A1 | 8/2005 | Lloyd | |
| 2005/0215238 A1 | 9/2005 | Macaluso | |
| 2005/0221876 A1 | 10/2005 | Van Bosch et al. | |
| 2005/0248456 A1 | 11/2005 | Britton et al. | |
| 2005/0266870 A1 | 12/2005 | Benco et al. | |
| 2005/0288038 A1 | 12/2005 | Kim | |
| 2006/0009240 A1 | 1/2006 | Katz | |
| 2006/0015404 A1 | 1/2006 | Tran | |
| 2006/0033625 A1 | 2/2006 | Johnson et al. | |
| 2006/0047573 A1 | 3/2006 | Mitchell et al. | |
| 2006/0061488 A1* | 3/2006 | Dunton | G06Q 10/109 |
| | | | 340/988 |
| 2006/0089158 A1 | 4/2006 | Lai et al. | |
| 2006/0095540 A1 | 5/2006 | Anderson et al. | |
| 2006/0176827 A1 | 8/2006 | Lehew et al. | |
| 2006/0178932 A1 | 8/2006 | Lang | |
| 2006/0194595 A1 | 8/2006 | Myllynen et al. | |
| 2006/0224863 A1 | 10/2006 | Lovett et al. | |
| 2006/0253282 A1 | 11/2006 | Schmidt et al. | |
| 2006/0253453 A1 | 11/2006 | Chmaytelli et al. | |
| 2006/0256959 A1* | 11/2006 | Hymes | H04M 1/26 |
| | | | 379/433.04 |
| 2007/0004393 A1 | 1/2007 | Forsberg et al. | |
| 2007/0037561 A1 | 2/2007 | Bowen et al. | |
| 2007/0037605 A1 | 2/2007 | Logan | |
| 2007/0054687 A1 | 3/2007 | Akita | |
| 2007/0136796 A1 | 6/2007 | Sanchez et al. | |
| 2007/0149195 A1 | 6/2007 | Choe et al. | |
| 2007/0182544 A1 | 8/2007 | Benson et al. | |
| 2007/0182818 A1 | 8/2007 | Buehler | |
| 2007/0232342 A1 | 10/2007 | Larocca | |
| 2007/0287379 A1 | 12/2007 | Matsuura | |
| 2008/0004951 A1 | 1/2008 | Huang et al. | |
| 2008/0032677 A1 | 2/2008 | Catovic | |
| 2008/0045236 A1 | 2/2008 | Nahon et al. | |
| 2008/0052169 A1 | 2/2008 | O'Shea et al. | |
| 2008/0114778 A1 | 5/2008 | Siegel | |
| 2008/0146205 A1 | 6/2008 | Aaron | |
| 2008/0146250 A1 | 6/2008 | Aaron | |
| 2008/0147773 A1 | 6/2008 | Aaron | |
| 2008/0169921 A1 | 7/2008 | Peeters | |
| 2008/0182563 A1 | 7/2008 | Wugofski et al. | |
| 2008/0182586 A1 | 7/2008 | Aaron | |
| 2008/0183571 A1 | 7/2008 | Aaron | |
| 2008/0215415 A1 | 9/2008 | Willms | |
| 2008/0268895 A1 | 10/2008 | Foxenland | |
| 2009/0176497 A1 | 7/2009 | Klein | |
| 2009/0176524 A1 | 7/2009 | David | |

(56) References Cited

U.S. PATENT DOCUMENTS

2009/0203317 A1 8/2009 Waung
2009/0292920 A1 11/2009 Willey
2013/0300561 A1 11/2013 Aaron

OTHER PUBLICATIONS

Woodings, "Rapid Heterogeneous Connection Establishment: Accelerating Bluetooth Inquiry Using IrDA", pp. 1-14 (2002).
Palo Wireless, "K1-Generic Access Profile," pp. 1-8, (Internet Archive Wayback Machine), <http://www.palowireless.com/infotooth/tutorial/k1_gap.asp>, 2004.
Aalto et al., "Bluetooth and WAP Push Based Location Aware Mobile Advertising System", pp. 1-10(2004).
Helio GPS-powered Buddy Beacon, <http://www.helio.com>, Dec. 9, 2006.
GPSLocatorPhone,<http://www.wherify.com/whereifone/kids.html?page-kids>, copyright 2006.
Dodgeball.com bringing your phoneto life, <http://www.dodgeball.com>, copyright 2006.
OnStar Technology, <http://www.onstar.com/US_english/jsp/explore/onstar_basics/technology.jsp>, copyright 2006.
Leopold et al. "Bluetooth and Sensor Networks: A Reality Check", SenSys '03, pp. 1-11, Nov. 2003.
U.S. Office Action dated May 30, 2014 in U.S. Appl. No. 14/024,325.
U.S. Office Action dated Oct. 14, 2014 in U.S. Appl. No. 14/024,325.
U.S. Notice of Allowance dated Dec. 31, 2014 in U.S. Appl. No. 14/024,325.
U.S. Office Action dated Mar. 22, 2010 in U.S. Appl. No. 11/611,475.
U.S. Office Action dated Sep. 3, 2010 in U.S. Appl. No. 11/611,475.
U.S. Office Action dated Jan. 6, 2011 in U.S. Appl. No. 11/611,475.
U.S. Office Action dated Apr. 18, 2011 in U.S. Appl. No. 11/611,475.
U.S. Office Action dated Jul. 2, 2012 in U.S. Appl. No. 11/611,475.
U.S. Office Action dated Dec. 14, 2012 in U.S. Appl. No. 11/611,475.
U.S. Notice of Allowance dated Mar. 21, 2013 in U.S. Appl. No. 11/611,475.
U.S. Office Action dated Jan. 22, 2016 in U.S. Appl. No. 14/681,836.
U.S. Notice of Allowance dated May 18, 2016 in U.S. Appl. No. 14/681,836.
U.S. Office Action dated Feb. 26, 2010 in U.S. Appl. No. 11/627,260.
U.S. Office Action dated Jun. 25, 2010 in U.S. Appl. No. 11/627,260.
U.S. Notice of Allowance dated Apr. 24, 2013 in U.S. Appl. No. 11/627,260.
U.S. Notice of Allowance dated Oct. 3, 2013 in U.S. Appl. No. 11/627,260.
U.S. Notice of Allowance dated Jan. 14, 2014 in U.S. Appl. No. 11/627,260.
U.S. Office Action dated Feb. 5, 2010 in U.S. Appl. No. 11/668,848.
U.S. Office Action dated Jul. 9, 2010 in U.S. Appl. No. 11/668,848.
U.S. Office Action dated Oct. 4, 2011 in U.S. Appl. No. 11/668,848.
U.S. Office Action dated Mar. 1, 2012 in U.S. Appl. No. 11/668,848.
U.S. Office Action dated Sep. 12, 2013 in U.S. Appl. No. 11/668,848.
U.S. Office Action dated Jan. 9, 2014 in U.S. Appl. No. 11/668,848.
U.S. Office Action dated Jan. 13, 2015 in U.S. Appl. No. 11/668,848.
U.S. Office Action dated Dec. 29, 2009 in U.S. Appl. No. 11/610,898.
U.S. Office Action dated Jul. 6, 2010 in U.S. Appl. No. 11/610,898.
U.S. Notice of Allowance dated Jun. 23, 2011 in U.S. Appl. No. 11/610,898.
U.S. Notice of Allowance dated Oct. 4, 2011 in U.S. Appl. No. 11/610,898.
U.S. Office Action dated Nov. 27, 2009 in U.S. Appl. No. 11/627,269.
U.S. Office Action dated Jun. 7, 2010 in U.S. Appl. No. 11/627,269.
U.S. Office Action dated Sep. 27, 2010 in U.S. Appl. No. 11/627,269.
U.S. Office Action dated Mar. 30, 2011 in U.S. Appl. No. 11/627,269.
U.S. Office Action dated Nov. 2, 2012 in U.S. Appl. No. 11/627,269.
U.S. Office Action dated Mar. 11, 2013 in U.S. Appl. No. 11/627,269.
U.S. Office Action dated Jun. 13, 2013 in U.S. Appl. No. 11/627,269.
U.S. Notice of Allowance dated Nov. 6, 2013 in U.S. Appl. No. 11/627,269.
U.S. Office Action dated Dec. 9, 2010 in U.S. Appl. No. 11/843,954.
U.S. Office Action dated May 25, 2011 in U.S. Appl. No. 11/843,954.
U.S. Office Action dated Dec. 29, 2011 in U.S. Appl. No. 11/843,954.
U.S. Office Action dated Jun. 5, 2012 in U.S. Appl. No. 11/843,954.
U.S. Notice of Allowance dated Aug. 15, 2012 in U.S. Appl. No. 11/843,954.
U.S. Notice of Allowance dated Nov. 6, 2012 in U.S. Appl. No. 11/843,954.
U.S. Office Action dated Jul. 20, 2010 in U.S. Appl. No. 11/611,345.
U.S. Office Action dated Feb. 7, 2011 in U.S. Appl. No. 11/611,345.
U.S. Office Action dated Aug. 3, 2011 in U.S. Appl. No. 11/611,345.
U.S. Notice of Allowance dated Feb. 9, 2012 in U.S. Appl. No. 11/611,345.
U.S. Office Action dated Apr. 10, 2009 in U.S. Appl. No. 11/610,890.
U.S. Office Action dated Jan. 23, 2009 in U.S. Appl. No. 11/611,434.
U.S. Notice of Allowance dated Sep. 2, 2009 in U.S. Appl. No. 11/611,434.
U.S. Office Action dated Jul. 17, 2009 in U.S. Appl. No. 11/610,927.
U.S. Notice of Allowance dated Dec. 30, 2009 in U.S. Appl. No. 11/610,927.
U.S. Notice of Allowance dated Feb. 24, 2010 in U.S. Appl. No. 11/610,927.
U.S. Notice of Allowance dated Apr. 7, 2010 in U.S. Appl. No. 11/610,927.
U.S. Office Action dated Oct. 28, 2009 in U.S. Appl. No. 11/611,517.
U.S. Office Action dated May 7, 2010 in U.S. Appl. No. 11/611,517.
U.S. Office Action dated Sep. 22, 2010 in U.S. Appl. No. 11/611,517.
U.S. Office Action dated Mar. 8, 2011 in U.S. Appl. No. 11/611,517.
U.S. Office Action dated Apr. 24, 2009 in U.S. Appl. No. 11/668,803.
U.S. Office Action dated Nov. 6, 2009 in U.S. Appl. No. 11/668,803.
U.S. Office Action dated Mar. 25, 2010 in U.S. Appl. No. 11/668,803.
U.S. Office Action dated Jul. 15, 2010 in U.S. Appl. No. 11/668,803.
U.S. Notice of Allowance dated Oct. 28, 2010 in U.S. Appl. No. 11/668,803.
U.S. Notice of Allowance dated Feb. 7, 2011 in U.S. Appl. No. 11/668,803.
U.S. Notice of Allowance dated Aug. 19, 2011 in U.S. Appl. No. 11/668,803.
U.S. Notice of Allowance dated Dec. 12, 2011 in U.S. Appl. No. 11/668,803.
U.S. Notice of Allowance dated Feb. 3, 2012 in U.S. Appl. No. 11/668,803.
U.S. Office Action dated Aug. 14, 2014 in U.S. Appl. No. 13/688,169.
U.S. Office Action dated Nov. 17, 2014 in U.S. Appl. No. 13/688,169.
U.S. Office Action dated Oct. 29, 2010 in U.S. Appl. No. 12/625,370.
U.S. Office Action dated Apr. 11, 2011 in U.S. Appl. No. 12/625,370.
U.S. Notice of Allowance dated Sep. 1, 2011 in U.S. Appl. No. 12/625,370.
U.S. Notice of Allowance dated Nov. 7, 2011 in U.S. Appl. No. 12/625,370.
U.S. Office Action dated Dec. 3, 2012 in U.S. Appl. No. 13/463,180.
U.S. Notice of Allowance dated Mar. 20, 2013 in U.S. Appl. No. 13/463,180.
U.S. Office Action dated Sep. 17, 2013 in U.S. Appl. No. 13/943,161.
U.S. Office Action dated Jan. 7, 2014 in U.S. Appl. No. 13/943,161.
U.S. Office Action dated Apr. 24, 2014 in U.S. Appl. No. 13/943,161.

* cited by examiner

| Record # | Encounter | Location | Temperature °F |
|---|---|---|---|
| 56 | sweet_baby_james | Airport | 76 |
| 100 | Randy Smith---ABD Inc. | Sales Convention | 70 |
| 1 | jhfvh09ucv0pu0eq | Lat 33.6499 Lng 84.4200 | 92 |
| 15 | jcefuv9-uf-0uv-u | Lat 33.6500 Lng 84.4201 | 92 |
| 30 | mnceq09uf3-9pojv | Lat 33.6500 Lng 84.4199 | 92 |
| 60 | mj vds-ui4w-iuff | Lat 33.6501 Lng 84.4199 | 95 |

610 → Record #
620 → Encounter
630 → Location
640 → Temperature °F
670

DEVICE, SYSTEM AND METHOD FOR RECORDING PERSONAL ENCOUNTER HISTORY

CROSS-REFERENCE TO RELATED APPLICATIONS

This patent application is a continuation of and claims priority to U.S. patent application Ser. No. 14/681,836, filed Apr. 8, 2015, now U.S. Pat. No. 9,456,051, which is a continuation of and claims priority to U.S. patent application Ser. No. 14/024,325, filed Sep. 11, 2013, now U.S. Pat. No. 9,015,492, which is a continuation of and claims priority to U.S. patent application Ser. No. 11/611,475, filed Dec. 15, 2006, now U.S. Pat. No. 8,566,602. U.S. patent application Ser. No. 14/681,836, U.S. patent application Ser. No. 14/024,325 and U.S. patent application Ser. No. 11/611,475 are incorporated herein by reference in their respective entireties.

TECHNICAL FIELD

Embodiments are related to mobile communication devices. The subject matter described herein relates more particularly to a system and method allowing a user of a wireless communication device to record and recall personal encounters.

BACKGROUND

Life is meeting people, making contacts and developing personal relationships. Traditionally the primary tool used to make a contact and to keep track of those people whom one encounters was the business card or an address book. There are a variety of methods and devices in the market to keep track of one's contacts including business card filing systems, business card scanners, rolodexes and numerous database products. However, all of these methods require physical delivery of a business card, a letter or verbal conversation. Recent innovation includes delivering business contact information via e-mail from which a database may be populated.

Business cards and address books are expensive to print, inconvenient to carry and are often forgotten when they may be needed most. Unless one works for a company, most people do not carry business cards. They certainly do not carry them to social or recreational activities. Therefore, it would be useful to have an inexpensive, effortless and omnipresent means to record personal encounters as one proceeds through their day.

Wireless communication devices are popular and ubiquitous devices amongst the general populace and may be used to store contact information. The cost of wireless communication devices has plummeted and functionality has improved exponentially. Most adults and a growing number of children routinely carry a cell phone or other wireless communication device on their person and often manually record contact information that they have obtained from their acquaintances. However, the contact information must first be obtained in the conventional and sometimes awkward manner of asking for it or otherwise being given it, and then the user must manually enter the contact information into the device. Thus, conventional wireless communications devices fail to adequately address a user's interest in easily obtaining information about personal encounters.

SUMMARY

While energized, wireless communication devices are continuously vigilant, scanning a frequency for an indication of an incoming call. The omnipresence, vigilance and computing power of a wireless communication device can be leveraged to record personal encounters and retrieve that information at a later time. It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Provided are exemplary embodiments including a method for creating and using a personal encounter history using a communication device. The method involves the communication device receiving the transmission of a pseudo identifier from a proximal communication device where the pseudo identifier is associated with the user of the proximal communication device. Once received, the method continues with the wireless communication device requesting and receiving the actual identification of the user of the proximal communication device that is correlated with the pseudo identifier.

Exemplary embodiments include a communication device including a transceiver capable of communicating wirelessly with a mobile telecommunications network, a memory device and a processor. The processor, being in communication with the memory device and the transceiver, is capable of receiving a pseudo identifier from a proximate communication device and then requesting an actual identification correlated with the pseudo identifier of the proximate communication device.

In accordance with other exemplary embodiments, a computer readable medium is provided with instructions to perform acts to create and use a personal encounter history using a communication device. While moving from place to place, the communication device may receive the transmission of a pseudo identifier from a proximal communication device where the pseudo identifier is associated with the user of the proximal communication device. Once received, the communication device may then perform acts to associate the proximal pseudo identifier with an environmental circumstance in which the request for the proximal pseudo identifier occurs.

Other apparatuses, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

BRIEF DESCRIPTION OF THE DRAWINGS

FIG. 6 is an abstract simplified depiction of a personal encounter database.

DETAILED DESCRIPTION

Figure 1A:
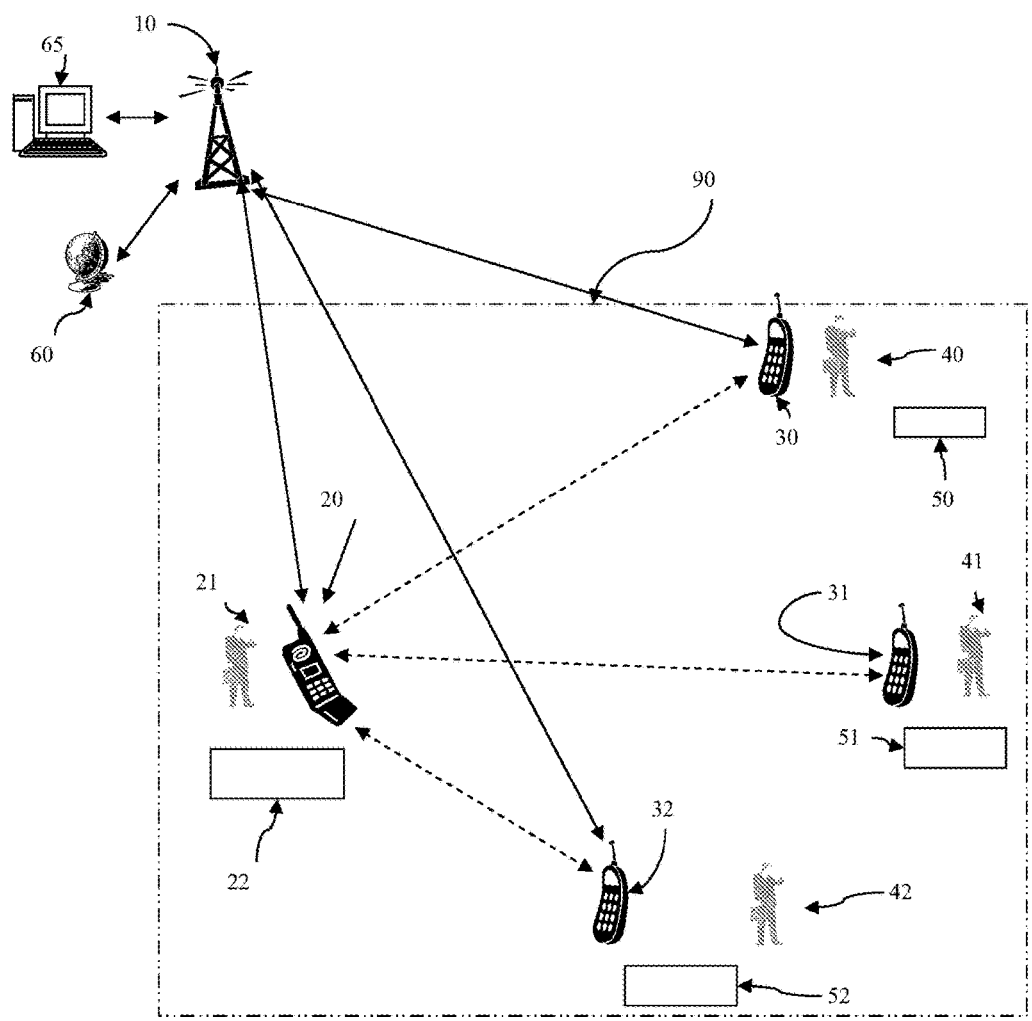
FIG. 1A is an overview illustrating a system for creating and using a personal encounter history utilizing a cellular network only.

The following disclosure is directed to an apparatus, system and method allowing the automatic recording of a personal encounter by a user of a wireless communication device ("WCD") with the user of a proximate WCD. A WCD may be any wireless communication device. Non-limiting examples may include a cell phone, a PDA, a pager, an MP3 player, a miniaturized computer and the like.

In the following detailed description, references are made to the accompanying drawings that form a part hereof and which are shown, by way of illustration, using specific embodiments or examples. Referring now to the drawings, in which like numerals represent like elements through the several figures, aspects of the apparatus and methods provided herein will be described.

The use of WCDs has grown exponentially over the last decade. Today, most adults and a growing number of children carry a WCD of some type or another. The most common WCD is the ubiquitous cell phone; however, there are millions of devotees to pagers, personal digital assistants ("PDA"), Blackberrys® and other devices. Technologies are also merging. For example MP3 players may be incorporated into cell phones and vice versa. Users of WCDs depend upon them to keep them connected to business, family and friends in an increasingly hectic world.

Throughout the day, one encounters many different people at various locations under a plethora of environmental conditions. Being social animals, people tend to stop and talk, even briefly, when encountering a person of interest. Business conventions, trade shows and seminars are usually designed with ample time for participants to meet and socialize. During an encounter, business cards are the traditional means by which people acknowledge and record the encounter.

However, small talk takes time that may not be available in one's hectic schedule. At a busy reception or convention it may be next to impossible to meet even a small fraction of those in attendance. A forgone encounter may be a sales opportunity lost or relationship that never begins. In these situations, it may be desirable to have a WCD that detects the user's encounters, records them and correlates them with environmental factors for easy retrieval at a later time. If so configured, a WCD may be able to detect and record similarly enabled WCDs merely by passing within a certain range. Transmitted identification data and the accompanying environmental circumstances, as measured by the WCD, may then be recorded and researched at the user's leisure. The number of encounters that may be recorded is limited only by the capacity of the memory devices available to the WCD.

As a non-limiting example, such a circumstance may concern a sales convention. Most sales conventions host hundreds if not thousands of participants. It is impossible to meet even a modest portion of the attendees, and most attendees harbor their business cards lest they exhaust their supply for those encounters where it may be important to have a card at the ready. By configuring a WCD according to the subject matter described herein, a user may effortlessly record an encounter with every participant with a similarly configured WCD that comes within a desired range and be able to retrieve the data at a later time.

In the following detailed description, references are made to the accompanying drawings that form a part hereof and which are shown, by way of illustration, using specific embodiments or examples. Referring now to the drawings, in which like numerals represent like elements through the several figures, aspects of the apparatus and methods provided herein will be described.

FIG. 1A is an overview of an exemplary system consistent with the disclosure herein. Wireless communication device ("WCD") 20 may be any type of wireless communication device. Non-limiting examples of a WCD 20 may be a cell phone, a PDA, a pager, a MP3 player, a miniature computer and the like, but a WCD does not have to be portable. As a further example WCD 20 may be a conventional desktop computer or a lap top with wireless capability. WCD 20 may include software objects to enable personal encounter capability.

WCD 20 may be capable of short range, local communication with nearby or "proximate" WCDs 30-32, that are similarly configured. There may be any number of proximate WCDs, however, only four are depicted herein for the sake of clarity. The term "proximate" used herein may be any short distance ranging from millimeters to a distance that may encompass a large meeting area or even a sports stadium. Such short range communication may be by radio transmission, audio transmission, light transmission or a combination thereof. Short range radio transmission may be accomplished by a transceiver capable of communicating using a short range radio standard that may include at least one of Bluetooth®, Ultra-Wideband (UWB), Wireless USB (WUSB), Wi-Fi (IEEE 802.11), Zigbee (IEEE 802.15.4), WiMAX, WiBro, infrared, near-field magnetics and Hiper-LAN standards. Light transmission may be accomplished using any available technology suitable for a manufacturer's purposes such as with Laser, infrared, visible and ultraviolet spectrums. Audio transmission may be accomplished in any desirable frequency range including those frequency ranges that are not discernible by humans.

Each of the WCD 20 and the proximate WCDs 30-32 may also be capable of long range communication with a telecommunications system 10. The telecommunications system 10 may be any telecommunications system including a mobile telecommunications system where the user may travel from base station-to-base station or hot spot-to-hot spot. A telecommunications system may be an analog or digital cellular telecommunications system. Moreover, the telecommunications system 10 may be a Personal Communication Service (PCS) in either of its analog and digital versions. The telecommunication system 10 may utilize Time Division Multiple Access (TDMA), Code Division Multiple Access (CDMA), Frequency Division Multiple Access (FDMA) or Global System for Mobile (GSM) technologies. The telecommunication system 10 may also be a satellite communication system and still fall under the purview of this disclosure. Telecommunication system 10 may optionally include a Geographic Information System ("GIS") 60 and a central server 65. A GIS is a centralized database system containing detailed cartographic and aerial photography information that may be used to augment the personal encounter information discussed herein.

Each of the WCD 20 and the proximate WCDs 30-32 is associated with a corresponding user 21 and 40-42, respectively, and each includes a unique user identifier 22 and 50-52, respectively, by which to identify itself to other WCDs. A user may use their own name or the name of their company much like a business card if one so chooses.

However, to safeguard privacy, user 21 may create within their respective WCD 20 a pseudo identifier ("PID") 22 which uniquely identifies the user 21. A PID may be a user created moniker not unlike a user ID used to access a web site. In the alternative, a PID may be a hash.

The WCD 20 may contain a software object that may generate a hash unique to the user 21. A hash is an algorithmic combination of two or more concatenated alphanumeric data strings. The data strings may be any alphanumeric information but it may be convenient to use information unique to the user 21. The data strings are first concatenated, combined and/or arranged in any suitable manner prior to being hashed. Hashing may be accomplished by any standard cryptographic hash algorithm. As non-limiting examples, algorithms such as SHA-1 or MD5 may be used. A simple hash may look like:

| String 1<br>495-86-7348 | + | String 2<br>Jun. 6, 1960 | → | Hash<br>Algorithm | Pseudo Identifier<br>93ieiw384n96dbhe |

The resulting PID hash is a unique identification for that particular user. However, it is certainly possible for a user to have multiple unique PIDs for different purposes much like a person may have multiple user IDs for different web sites. Each of the user IDs are still unique to that particular user.

Figure 1B:
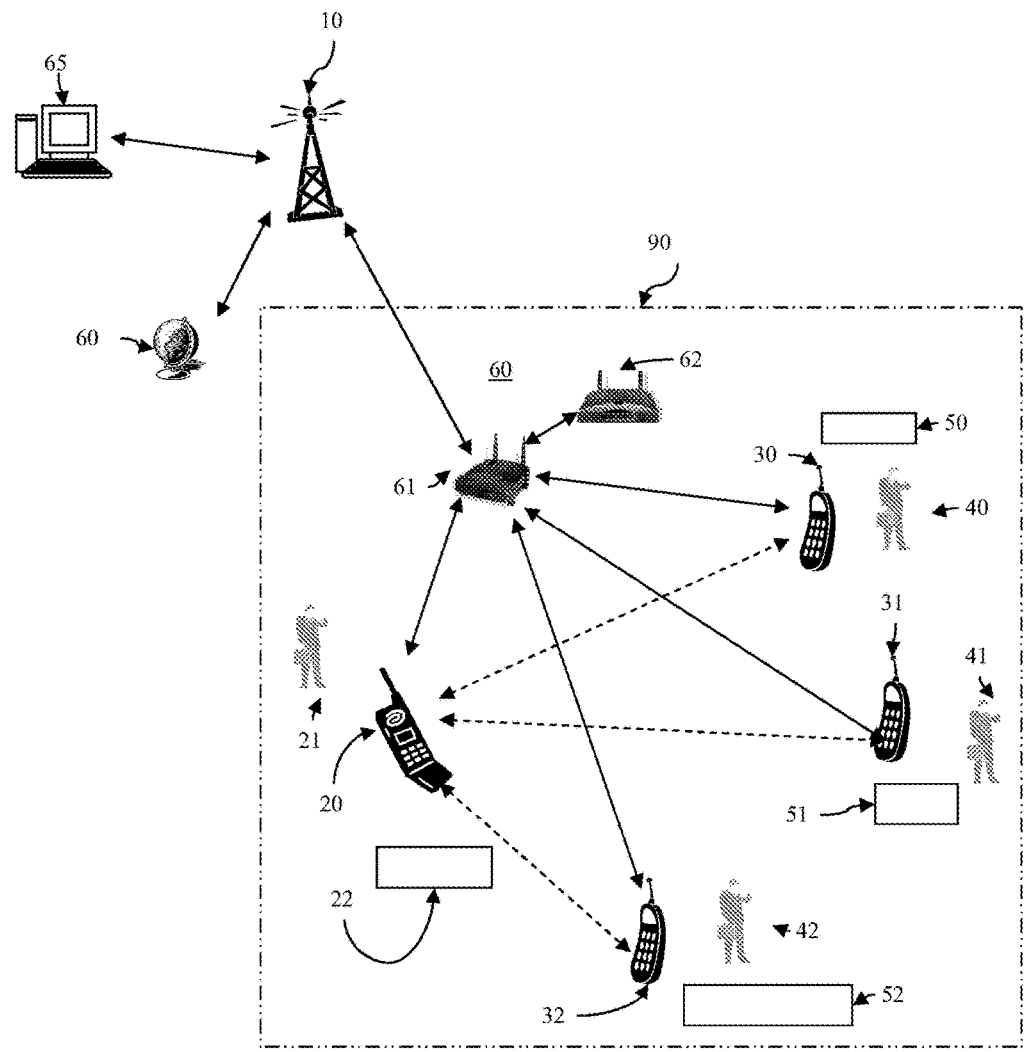
FIG. 1B is an overview illustrating a system for creating and using a personal encounter history utilizing a local wireless network.

FIG. 1B may be an alternative arrangement operating with a WiFi hotspot 90. The WCDs 20 and 30-32 may be in radio communication with the telecommunication system 10 from hotspot 90 using transceiver 61. The Telecommunications system 10 may be a Personal Communication Service (PCS) in either of its analog and digital versions. The telecommunication system 10 may utilize Time Division Multiple Access (TDMA), Code Division Multiple Access (CDMA), Frequency Division Multiple Access (FDMA) or Global System for Mobile (GSM) technologies. The telecommunication system 10 may also be a satellite communication system. Alternatively, the transceiver 61 may be in communication with router/switch 62. Router 62 may be able to transmit information to telecommunication system 10 via Voice over IP ("VOIP"), power line transmission and the like.

Locally, hotspot 90 may be operating under any of a number of radio standards via transmitter 61. Radio standards may include Bluetooth®, Ultra-Wideband (UWB), Wireless USB (WUSB), Wi-Fi (IEEE 802.11), Zigbee (IEEE 802.15.4), WiMAX, WiBro, near-field magnetics and HiperLAN standards. Within hotspot 90, WCDs 20 and 30-32 may also be able to communicate among themselves via a local transceiver 130 that may operate under a different radio protocol, light transmission, audio transmission or a combination thereof. The type of transmission medium might depend upon, among other factors, the power output and the expected distance between communication WCDs. For example, very short distances measured in inches or feet may be suited to audio or light transmission. Longer distances may require a radio frequency transmission.

Figure 2:
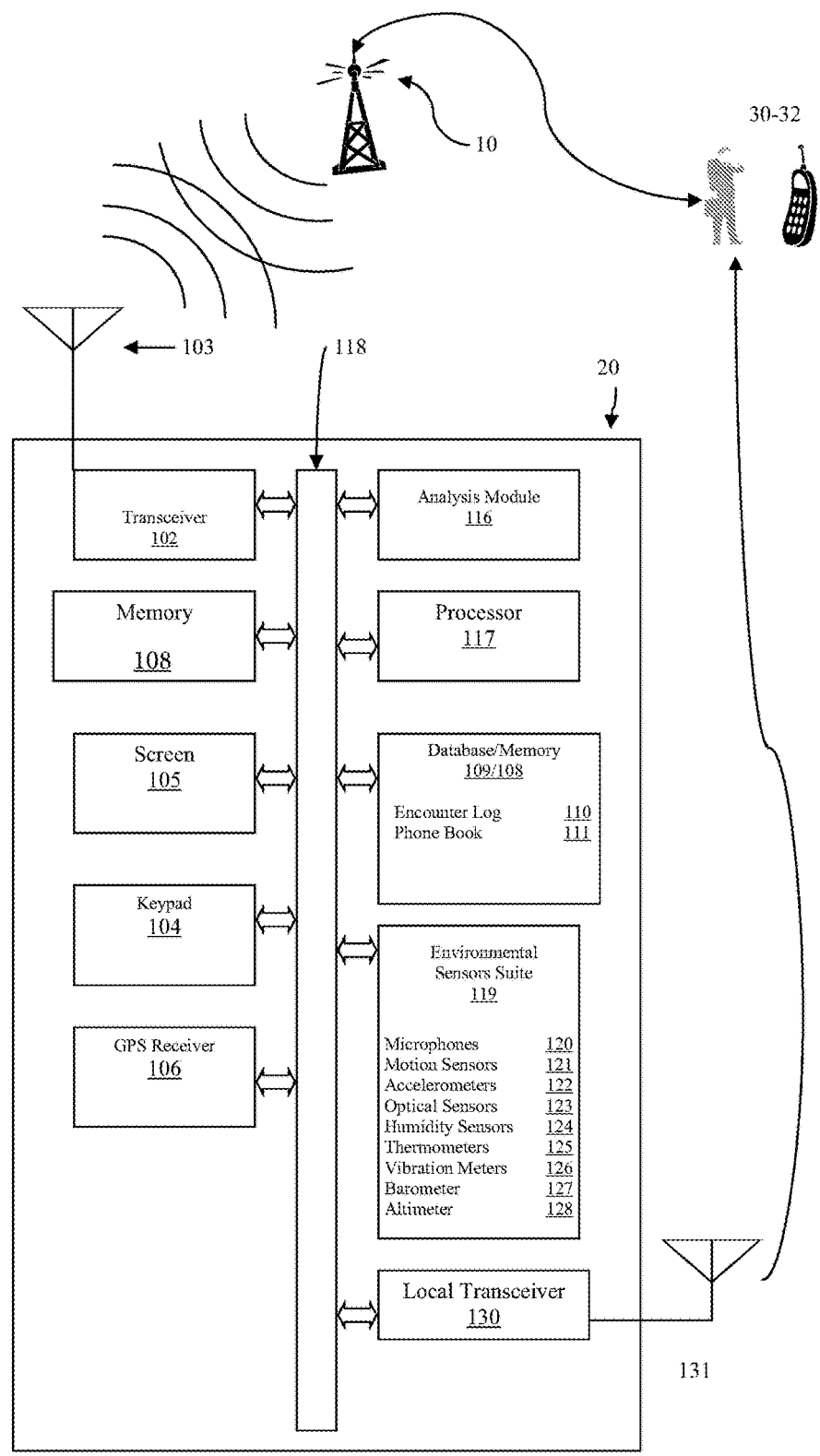
FIG. 2 depicts an example of a wireless communication device configured to create and use a personal encounter history.

FIG. 2 depicts a non-limiting example of a WCD 20 and its components. WCD 20 may include a Radio Frequency ("RF") transceiver 102 and an associate antenna 103. Transceiver 102 may be capable of communicating wirelessly through telecommunications system 10 with proximate WCDs 30-32. Optionally, a WCD 20 may include a secondary transceiver 130 capable of directly communicating with proximate WCDs 30-32 within a maximum effective range. Secondary transceiver 130 may be a radio transceiver capable of short range transmissions and may have a secondary antenna 131 or may also communicate by transmitting light or sound signals. Or there may be a combination of all three types of transmission.

WCD 20 may also include a screen 105 and keypad 104. Screen 105 and keypad 104 act as interfaces with user 21. Further, WCD 20 may include a Global Position System ("GPS") receiver from which to obtain the geographical position of WCD 20. Alternatively, WCD 20 may be configured to determine its position by triangulation. Further, a central server 65 of network 10 may also perform any triangulation services.

WCD 20 may also include one or more environmental sensors 120-128 individually or coordinated in a sensor suite 119. The sensors may include any number of environmental sensors as required by a manufacturer's design. Sensors may include optical sensors, audio sensors, motion sensors and weather sensors. Audio sensors may record the voice of the proximate WCD user and the video sensor may capture his picture at the time of an encounter, for example. Further, environmental and geographic data may also be requested and received from a central server 65 within telecommunications system 10. Environmental data from the sensor suite 119 may be used to associate and/or correlate personal encounters within the context of the user's surroundings at the time of an encounter. Environmental sensors may be capable of collecting biometric data from the user himself. Such biometric data may include heart rate, temperature or the user's activity level. Activity level may be measured by a pedometer, for example.

WCD 20 may include an Analysis Module ("AM") 116. An AM 116 may comprise a single module or several sub modules working in unison. A "module" may comprise software objects, firmware, hardware or a combination thereof. The AM 116 may control the timing and duration of an environmental sampling. A sample may be an instantaneous/spot sample or the sample may extend over an extended period of time as may be required by the analysis that is to be performed by the AM 116. The environmental samples utilized by the AM 116 in determining a user's circumstances may be a single sample from a single sensor, sequential samples taken from a single sensor or coordinated samples of any desired duration taken from multiple sensors. Samples can also be taken continually and/or periodically. Where sensor periodicities between sensors vary, the AM 116 may designate that one or more sensor readings remain valid until designated otherwise. AM 116 may coordinate the sampling periodicity to optimize sensor suite 119 performance. Further, the AM 116 may direct one or more sensors in sensor suite 119 to take immediate, ad hoc readings or a series of rapid readings. Sample times and periodicity may also be controlled by the user as a user preference.

Sample and signal processing techniques are well known and references to such are widespread and ubiquitous in the art. Non-limiting examples of calculated quantities potentially relevant to a determination of current circumstances may include peak-to-average ratios, variation, frequency of surpassing a threshold, spectral shape analysis via Fourier transforms of time-samples (e.g. Fast Fourier Transforms), spectral shape variation, variation rate and frequency spectrum analysis (e.g. audio, vibration and/or optical). It may also be useful to sample, compare or analyze different color CCD pixels sensed by a camera.

Further, each measured audio, motion and optical circumstance sample may be separated into sub-bands of the sensor's range, be it frequency or other type of range, by passing signals from sensor suite 119 through stacked band-pass filters. Derived aspects may be determined via well known digital signal processing methods in addition to or instead of analog filtering and ratio detection techniques. The analysis techniques discussed herein are non-limiting examples of techniques that may be used within an AM 116. Other techniques that may be known to the art may be desirable to determine certain aspects.

As non-limiting, illustrative examples of analysis, the AM 116 may directly determine the peak and average intensity levels concerning the user's audio and/or optical environment utilizing audio and optical sensors such as a microphone and a camera. AM 116 may determine facts about the user's current circumstances by sampling peak and average translational amplitude (i.e. speed), peak and average spin amplitude, and peak and average vibration. Such measurements may be conducted with inputs from a GPS 106, accelerometers 122, tilt meters, vibration meters 126 and the like. Although a GPS 106 may calculate speed when operating under good conditions and strong satellite signals, intermittent reception can hinder GPS speed measurements. Therefore, it may be useful to combine a plurality of sensor inputs to determine a parameter such as speed in order to better ensure a satisfactory level of accuracy when one or more sensors is impaired or ineffective for any reason, including triangulation. Further, AM 116 may utilize indicators of a user's current or past activity by also utilizing information such as whether there is a call in progress, whether there is menu access/manipulation, searching a contact list, dialing, repeated attempts to dial and the status of a battery charge.

As a non-limiting example using sensor suite 119 and AM 116 the user may have had an encounter with a person in the parking lot of a local mall on a hot sunny day. The user may have had a number of encounters that day both inside and outside the mall. In order to locate the user ID of that particular encounter, the user may query or search a list of his encounters that day looking for an encounter that occurred at an approximate time and that registered a 92° ambient temperature and a low noise level, for instance. An ambient temperature of 70° associated with a previous or subsequent encounter may indicate other encounters that occurred inside the mall or while driving in the parking lot in an air-conditioned car.

The personal encounters and the corresponding environmental circumstances measured may be saved to a database 109 resident in memory device 108. The memory device 108 may be comprised of any number or types of memory devices that conform to a manufacturer's requirements. Examples of memory devices include magnetic disks, flash memory, memory sticks, Random Access Memory, and Read Only Memory. The memory 108 may be volatile or non-volatile or a combination thereof and may store instructions to be performed by the processor 117 when receiving and sending associated information. As discussed above in relation to the WCD 20, the processor 117 and the memory 108 are examples of computer readable media. The list of useful memory devices continues to grow over time and any specific examples mentioned herein are not intended to limit the particular device discussed. The memory 108 may contain other varied information and/or instructions including pass codes and pseudo identifiers.

Returning to the discussion of FIG. 2, the WCD 20 may have a processor 117 to coordinate the function of its various components. Processor 117 may include a central processing unit, an embedded processor, a specialized processor (e.g. digital signal processor), or any other electronic element responsible for interpretation and execution of instructions, performance of calculations and/or execution of voice recognition protocols. Processor 117 may communicate with, control and/or work in concert with other functional components, including at least the sensor suite 119, the transceivers 102/130, the GPS receiver 106, the analysis module 116, and the database 109. Communications between and among the transceiver 102, the screen 105, the keypad 104, the GPS receiver 106, alternative transceiver 130, environmental sensor suite 119 and other WCD 20 components may be facilitated through a bus 118. Bus 118 may be comprised of one or a plurality of busses as is desired by a manufacturer.

Figure 3:
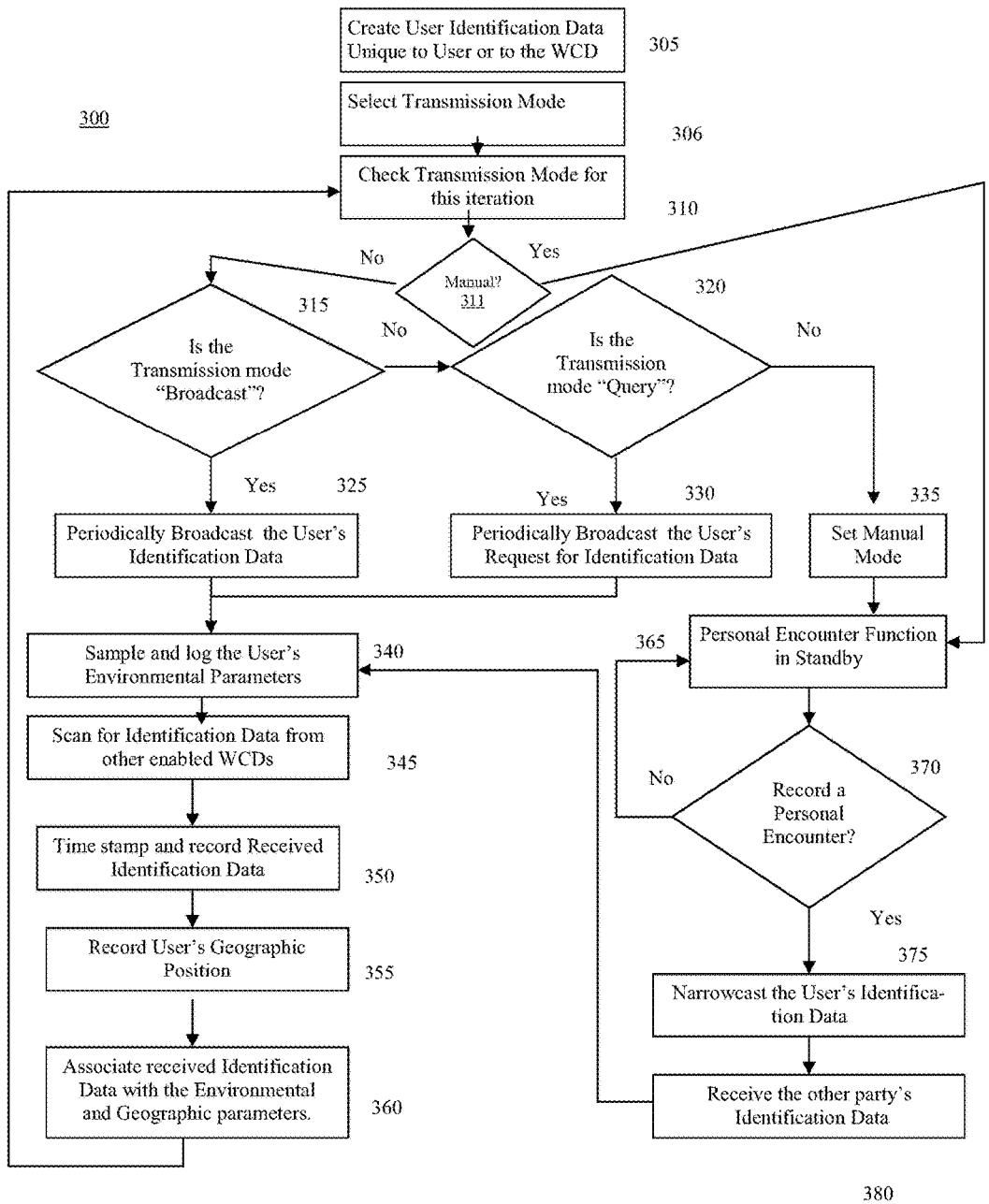
FIG. 3 is an exemplary flow chart demonstrating a method for creating a personal encounter history.

FIG. 3 is a flow chart illustrating an example routine 300 for creating a personal encounter history with a WCD 20. Being merely exemplary, it should be noted that the processes presented may be combined together, rearranged in their order and split into sub-processes as would occur to one of ordinary skill in the art without departing from the scope of the disclosure presented herein. The user 21 of the WCD 20 may first create a user ID at process 305. The user ID 22 may be a data string that identifies the user or the user's WCD 20 to other wireless communication devices. Therefore the user ID may be a unique identifier. The user ID may be a true identification such as the real name of the user or the name of the user's business. However, privacy may be an overriding concern, as such, a PID may be created. A PID may be a user created moniker such as "sales_boss". Alternatively, the WCD 20 may contain a software object that may create a hash based on or more concatenated alpha numeric strings as more fully described above.

There are several personal encounter modalities that WCD 20 may operate in at the option of the user. The WCD 20 may be able to toggle through the several modalities by manipulating a set of keys on keypad 104 or touch screen 105. The user 21 may be able to select a desired mode at process 306.

A personal encounter WCD 20 may be able to operate in a "broadcast mode" 315, a "query mode" 320 or a "manual mode" 335. The WCD may be able to operate in all three modes concurrently. However, FIG. 3 illustrates an iteration approach wherein each "broadcast" takes only an instant in time as perceived by a user. In this respect, the WCD 20 checks to verify the current operating mode selection for each iteration at process 310.

In a broadcast mode, the WCD 20 broadcasts its user ID to the world on a periodic basis at process 325. The broadcast periodicity may be regular or irregular. Alternatively, the user may choose to instruct his WCD 20 to periodically broadcast a query to proximate WCDs to transmit their user IDs as responses. Or, the WCD 20 may be programmed to broadcast both its user ID 22 and also broadcast a query for other user IDs 50-52. The specific method(s) will depend on user choice and possibly a system standard developed by a telecommunications service provider.

Personal encounter situations vary with the circumstances. As such, a user 21 may desire to control the broadcast of his user ID by adjusting what may be called an "incognito level". In a public trade show, for example, a user 21 may desire that their user ID 22 be distributed widely such that his presence at the show registers on as many proximate WCDs as possible. In such situations the user may want his incognito level to be low. For a low "incognito level" the broadcast transmission power may be increased to a maximum level commensurate with the battery capacity of the WCD 20. To cover a wide area a low incognito level may use a radio transceiver as the local transceiver 130 with which to broadcast. As an additional feature of an incognito level, the WCD 20 may be configured to merely respond with user ID 22 in response to a query from a proximate WCD 30-32 for User IDs. Such a mode may improve privacy and reduce power consumption.

In other situations, the user 21 may desire that only a limited group of discrete individuals receive and record their user ID 22. Therefore, the user 21 may desire a high incognito level. To accomplish that the WCD 20 may reduce the broadcast power of the transceiver 130 or may select a transceiver that communicates via a high pitched, inaudible sound or infrared light transmissions. There are any number of incognito levels as will be apparent to one skilled in the art.

Further, the user 21 might select a "manual mode" 335 whereby the user 21 and the proximate WCD user 40-42 may more privately transmit their user IDs by manipulating a button or a set of keys on keypad 104 or touch screen 105. Such discrete transmissions may be done using an infrared light transmission, audio transmission or a very low power radio transmission. Manual mode allows the WCD 20 to remain in standby 365 until needed. Alternatively, manual mode may be used to override the previous mode setting at process 311. If the mode was set to "broadcast", "query" or both, activating the manual mode may suspend the previous mode at process 365 to allow the manual mode functionality to take place. Alternatively, the WCD 20 may also be placed in "manual-broadcast", "manual-query" or all in three modes simultaneously where the user may transmit or receive at will in addition to the automatic broadcast.

If user 20 desires to transmit his user ID 22 he may narrowcast his user ID 22 by bringing his WCD 20 within range of a proximate WCD 30-32 and triggering a single transmission, or a short burst of transmissions from local transceiver 130. Simultaneously or sequentially, the proximate WCDs 30-32 may transmit their user IDs 50-51 which are received by WCD 20 at process 380. In addition, the manual mode may allow the user to flag or annotate a particular encounter for easy retrieval. Annotation of an encounter may include the taking of a photograph with an optical sensor (i.e., a camera) integral to the WCD 20 or typing an annotation.

Regardless of the operating mode in use, the receiving WCD 20 may sample the user's 21 environmental circumstances with sensor suite 119 at process 340, as discussed above. Sample results are time stamped and stored in database 109 until uploaded to central server 65. Simultaneously or nearly simultaneously with the sample, the WCD 20 may receive the user IDs 50-52 of any proximate WCDs 30-32 that may be transmitting within reception range at process 345. The received user IDs 50-52 may then be time stamped and stored to database 109 in memory device 108 at process 350. It should be noted that WCD 20 may be programmed to recognize a particular proximate user ID or set of proximate user IDs 50-52 when received and to alert the user 21. Thus user 21 may be notified when an expected or unexpected user 50-52 has arrived within range of WCD 20.

The user's 21 geographic position may also be recorded at the time of recording at process 355. The user's 21 position may be determined from the GPS receiver 106 or the WCD 20 may triangulate its position if it is so configured. To facilitate the use of geographic data of the user 21, a third party or the telecommunication system GIS 60 may assign a location pseudo ID (a "LPID") so that an alpha numeric name may be substituted in the data base for raw GPS coordinates. Such LPID may be "The ABC Club, Atlanta", for example, instead of a latitude and longitude.

At process 360, each user ID 50-52 received from proximate WCD 30-32 may be associated and/or correlated by processor 117 with at least some of the environmental data sampled by sensor suite 119 at process 340; the time the user ID 50-52 was received; and may also include the geographic position where the user was located when the user ID 50-52 was recorded (See FIG. 6). WCD 20 may also correlate a personal encounter with the presence of other proximate users. In situations where there are multitudes of proximate WCDs, user 21 may screen out undesired, distant proximate users by setting a limit on the range to those users. Using a sports stadium as an example, there may be thousands of potential proximate WCDs that could be recorded. Such a large volume of irrelevant encounters may be undesirable. Therefore, user 20 may limit the acceptance of any user IDs to those encounters that occur within a few feet of WCD 20.

After the data is correlated the process may begin anew at process 310. A WCD 20 may have limited data storage capacity in memory device 108. To increase the operating capacity of WCD 20, WCD 20 may periodically upload its latest personal encounter history from memory device 108 to a central server 65 within telecommunication system 10.

Figure 4:
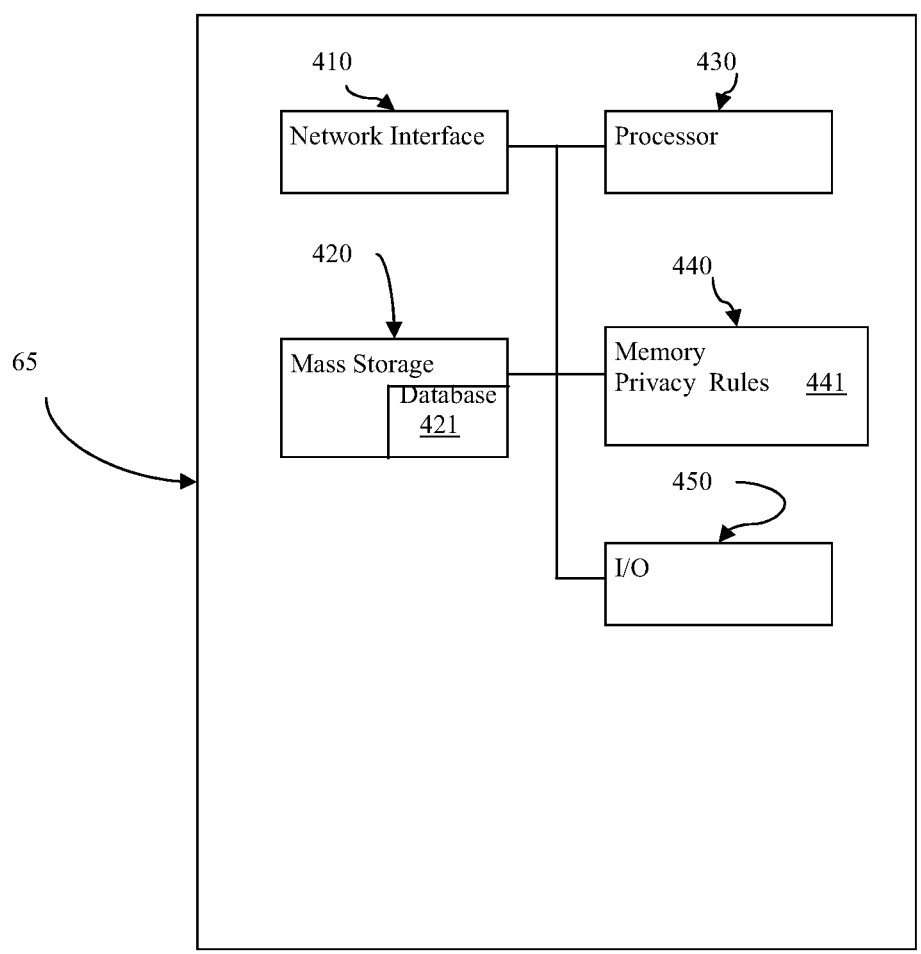
FIG. 4 is a depiction of a central server.

FIG. 4 shows components of an example of the central server 65. The central server 65 may include the standard components of a server computer including a processor 430, memory 440, input/output devices 450, mass storage 420, and a network interface 410. The processor 430 communicates with external devices including WCD 20, WCDs 30-32 and router 62 via the network interface 410. The processor 430 may be a single processor, multiple processors or multiple distribute processor and may be a dedicated/special purpose processor or a general purpose programmable processor or some combination. The processor 430 performs actions based on instructions either hard coded into the processor 430 or stored in the memory 440. Processor 430 executes several system functions including receiving encounter information from reporting WCDs, storing and collating the encounter information, responding to query's for identification information and, if desired, facilitating the contact between users. Examples of the logical operations performed by the processor are discussed below in relation to FIG. 5a.

The memory 440 may be volatile or non-volatile or a combination thereof and may store instructions to be performed by the processor 430 when receiving and sending information. As discussed above in relation to the WCD 10, the processor 430 and the memory 440 are examples of computer readable media.

The input/output device 450 may be used for local operation and management of the central server 65. The input/output device 450 may include a keyboard, mouse, display, and the like.

The mass storage device 420 may contain PID and actual user identification information and/or it may contain applications such as an operating system for the personal encounter service. Thus, the processor 430 may access the storage device 420 when implementing the personal encounter service. The mass storage device 420 is another example of a computer readable medium.

At his leisure, user 21 may sort, correlate and search his personal encounter database 109 or 421 to mine contact information previously recorded. Since each personal encounter had been time stamped and correlated with the environmental factors including geographic location, the personal encounter database may be categorized and searched in a variety of ways.

Figure 5A:
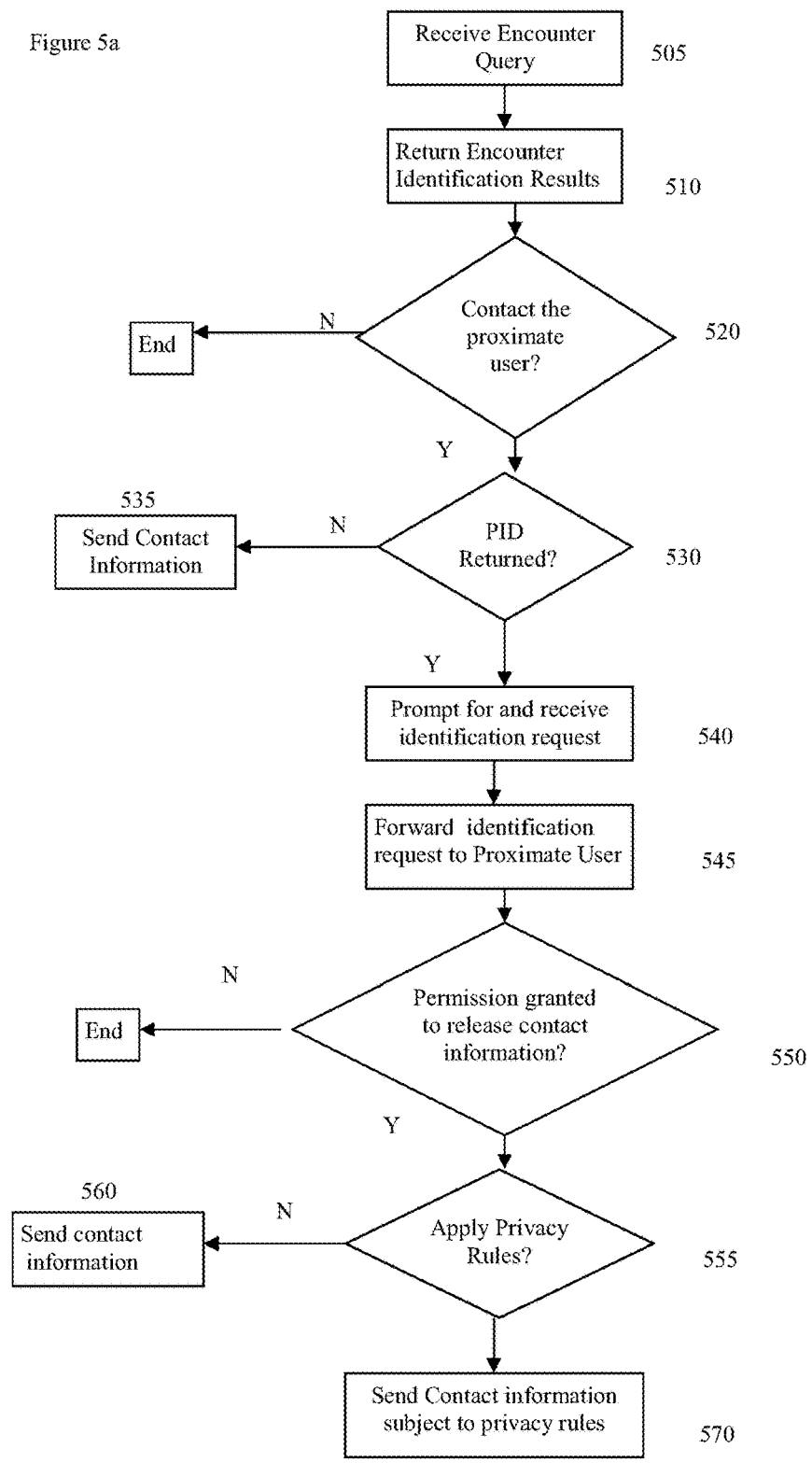
FIG. 5A is an exemplary flow chart demonstrating the operation of the central server for creating and using a personal encounter history.

FIG. 5a is a flow chart illustrating a method for retrieving PIDs and actual identification information by central server 65. Being merely exemplary, it should be noted that the processes presented may be combined together, rearranged in their order and split into sub-processes as would occur to one of ordinary skill in the air without departing from the scope of the disclosure presented herein. As a non-limiting example, it is assumed that user 21 wishes to get in touch with the user 40 of proximate WCD 30 whom he briefly met at the airport departure lounge the previous day along with a mutual friend 41. The user 21 may use his WCD 20 to search his personal encounter database 421. Alternatively, user 21 may access his personal encounter database 421 over the internet via a web page or by an interactive voice response system over the telephone.

User 21 knows the encounter was made at the airport between 10:00 and 11:00 AM while inside at the departure gate with their mutual friend 41 who also possesses the proximate WCD 31. Beginning at process 505, user 21 may initiate a query to the central server 65 and database 421 for all encounters between 10:00 and 11:00, User 21 may narrow his query results further, by selecting a LPID (i.e., Airport). An initial query may be as general or specific as the user may wish it to be by adding search criteria. The user 21 may also remember that the encounter was made while both parties were sitting in company with user 41. As such user 21 may again limit his selections by selecting a limitation of his rate of motion as zero velocity. Conversely, if the encounter was made while riding on the parking shuttle or the tram, velocity may be non-zero or erratic and there may have been characteristic traffic or tram sounds sampled as well. User 21 may also look for an encounter at the same time as an encounter with user 41. If the user 21 has not yet uploaded his encounter information to the central server 65 then the query would be made to database 109 of WCD 20 instead of the database 421 of central server 65.

When the user 21 locates the personal encounter of interest in database 421 at process 510, the user 21 may want to contact proximate user 40 through telecommunication system 10. At decision point 520, if user 40 had used his true name during the encounter then the user 21 may simply decide to call the person. Telecommunication system 10 may maintain a user directory. Or, proximate user 40 may have included contact data in his identification information.

However, if proximate user 40 has used a pseudo identity to protect his privacy there may be no direct way to contact user 40 since the identification information returned by the central server may simply be a PID. The processor 430 decides if a PID was used at decision point 530. If a true ID was used the contact information may be sent by central server 65 directly to user 21 at process 535. If a PID was used, user 21 may be prompted by central server 65 to query central server 65 for the contact information based on user 40's PID. Central server 65 may receive the query at process 540. The central server 65, in turn, forwards the query to proximate user 40 thereby notifying them of the identification request at process 545. If central server 65 receives a denial from user 40 at decision point 550, then the process ends. If not, proximate user 40 may authorize the server 65 to provide user 21 with their identity and/or contact information at process 560.

The disclosure authorization granted by proximate user 40 at process 550 may be regulated by a set of privacy rules 441 at process 570. As an illustrative example, there may be a phased disclosure. Upon the first identity query, user 40 may have authorized telecommunications system 10 to automatically release his name and e-mail to user 21. Also as an example, if user 21 was casually known to user 40, user 40 may indicate that the telecommunications system 10 is authorized to release his home phone as well. A myriad of phased disclosure rules may be designed by one skilled in the art to satisfy a particular purpose. An additional authorization rule may be a "disclose yourself first" rule where the requesting party must fully disclose their identity and contact information before the telecommunications system 10 can release the queried party's information. Once the privacy rules have been complied with the central server 65 may release the contact information of user 40.

It should be noted that the above disclosure may be combined with other forms of privacy security. For example, a user's true identity may be rights protected much like a music file is protected from being copied from a licensee. Such additional protections would prevent one user who knows or has access to a second user's true identity from electronically transferring/selling the data to a third user.

Figure 5B:
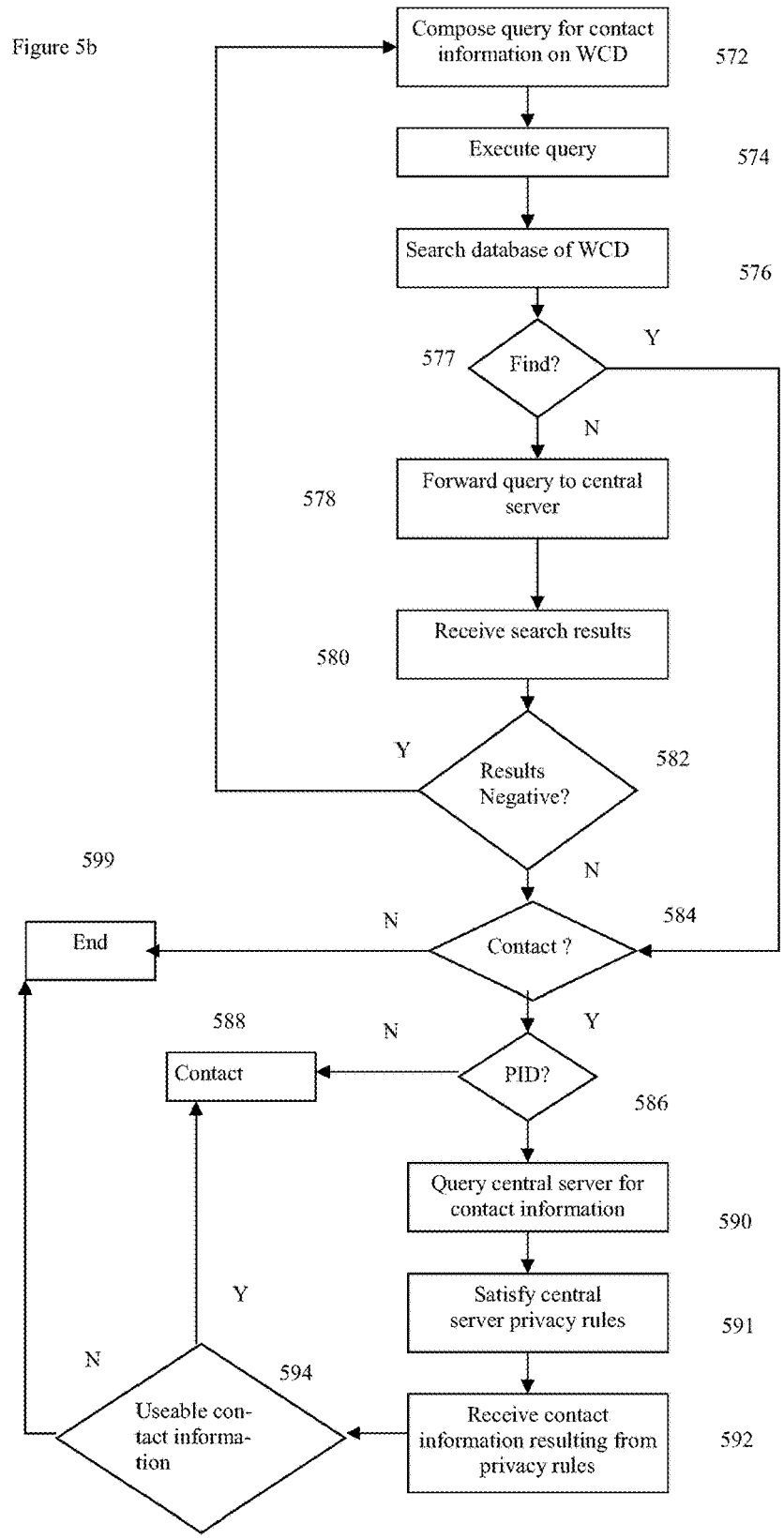
FIG. 5B is an exemplary flow chart demonstrating the operation of a wireless communication device for creating and using a personal encounter history.

Continuing the above example where user 21 wishes to get in touch with the user 40 of proximate WCD 30, FIG. 5b is a flow chart illustrating a method for retrieving PIDs and actual identification information by a WCD such as WCD 20. Being merely exemplary, it should be noted that the processes presented may be combined together, rearranged in their order and split into sub-processes as would occur to one of ordinary skill in the art without departing from the scope of the disclosure presented herein.

At process 572, the user of WCD 20 composes a query to find the identity/contact information for user 40 as discussed, supra. At process 574, the user sends the query. Given the possibility that the central server 65 may have not been updated since the encounter, the WCD 20 may search its local database 109 for the information at process 576. If the encounter is found then the WCD 20 may prompt the user as to whether they want the contact information for the user at decision point 584. If not, then the process ends at process 599. If the user wishes the contact information then the WCD 20 decides if the information in database 109 is useable contact information at decision point 586. If the contact information is sufficient to contact the user of WCD 30 then WCD 20 may contact WCD 30 directly or may provide the contact information to user 21. If the encounter information is simply a PID then WCD 20 sends a query to central server 65 for actual identification/contact information at process 590. If the privacy rules 341, discussed above, are fulfilled at process 591 then WCD 21 may receive the contact information at process 592. If the contact information is determined to be useful at decision process 594 (i.e., a telephone number or e-mail), WCD 30 may then be contacted at process 588. Contact may be via telephone call or by some form of text message. If the contact information is not provided or is insufficient to contact the user 40, then the process ends at process 599.

However, if WCD 20 cannot find the encounter in its database 109 at process 577 then WCD 20 forwards the query to central server 65 at process 578 so that the central server may search its database 421. If the search results received from the central server 65 database 421 are determined to be unproductive at decision point 582 then the user is prompted for a new/refined query at process 572. On the other hand, if the search results received from the central server 65 database 421 are productive at decision point 582 then the user is prompted as to whether they wish to contact the WCD 40 at decision point 584 and the process continues as described above.

FIG. 6 is a simplified depiction of a database 421 containing a number of encounter records 670. In this example column 610 contains the record or encounter number. Column 620 contains the proximate user with whom an encounter was made. Column 630 contains the location were the encounter occurred and column 640 contains the ambient temperature at the time the encounter was made. Database 421 may actually contain a plethora of environmental information, including time and date, commensurate with the capabilities of the sensor suite 119 and other WCD features.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A mobile communication device comprising:
   a sensor;
   a processor; and
   a memory that stores instructions which, when executed by the processor, cause the processor to perform operations comprising:
   receiving a pseudo identifier provided by a communication device within a range of the mobile communication device, wherein the pseudo identifier is received by the mobile communication device as a result of a broadcast of the pseudo identifier by the communication device, and wherein the pseudo identifier is created by a user of the communication device;
   recording location data indicating a location of the mobile communication device at a time associated with when the pseudo identifier is received from the communication device,
   sampling, via the sensor, environmental data at the time associated with when the pseudo identifier is received from the communication device, and
   correlating the pseudo identifier provided by the communication device with the location data indicating the location of the mobile communication device at the time associated with when the pseudo identifier is received from the communication device and with the environmental data collected via the sensor at the time associated with when the pseudo identifier is received from the communication device to create an encounter history.

2. The mobile communication device of claim 1, wherein the encounter history comprises a history of encounters between the mobile communication device and communication devices that come within the range of the mobile communication device.

3. The mobile communication device of claim 1, wherein the pseudo identifier includes a hash.

4. The mobile communication device of claim 1, wherein the pseudo identifier includes a moniker.

5. The mobile communication device of claim 1, wherein the operations further comprise:
   sending a query to an intermediary computing device requesting an actual identification of the user of the communication device corresponding to the pseudo identifier provided by the communication device; and
   receiving, responsive to a determination by the intermediary computing device that consent rules for providing the actual identification of the user of the communication device are met, the actual identification of the user of the communication device that corresponds with the pseudo identifier provided by the communication device.

6. The mobile communication device of claim 1, wherein the operations further comprise:
   sending a query to an intermediary computing device requesting contact information for the user of the communication device corresponding to the pseudo identifier provided by the communication device; and
   receiving, responsive to a determination by the intermediary computing device that consent rules for providing the contact information for the user of the communication device are met, the contact information for the user of the communication device corresponding to the pseudo identifier provided by the communication device.

7. The mobile communication device of claim 1, wherein the operations further comprise:
   receiving, from a user of the mobile communication device, a broadcast level;
   adjusting, based on the broadcast level received from the user of the mobile communication device, a level of a broadcast transmission power associated with the mobile communication device; and
   providing, according to the level of the broadcast transmission power associated with the mobile communication device adjusted based on the broadcast level received from the user of the mobile communication device, an identifier associated with the mobile communication device to communication devices.

8. The mobile communication device of claim 1, wherein the environmental data comprises at least one of an ambient temperature of an environment associated with the mobile communication device, a speed associated with the mobile communication device, audio of the environment associated with the mobile communication device, or video of the environment associated with the mobile communication device.

9. The mobile communication device of claim 1, wherein the operations further comprise correlating the pseudo identifier provided by the communication device with identifiers provided by other communication devices at the time associated with when the pseudo identifier is received from the communication device.

10. A non-transitory computer readable medium storing instructions that, when executed by a processor of a mobile communication device, cause the processor to perform operations comprising:
    receiving a pseudo identifier provided by a communication device within a range of the mobile communication device, wherein the pseudo identifier is received by the mobile communication device as a result of a broadcast of the pseudo identifier by the communication device, and wherein the pseudo identifier is created by a user of the communication device;
    recording location data indicating a location of the mobile communication device at a time associated with when the pseudo identifier is received from the communication device;
    sampling, via a sensor of the mobile communication device, environmental data at the time associated with when the pseudo identifier is received from the communication device; and correlating the pseudo identifier provided by the communication device with the location data indicating the location of the mobile communication device at the time associated with when the pseudo identifier is received from the communication device and with the environmental data collected via the sensor at the time associated with when the pseudo identifier is received from the communication device to create an encounter history.

11. The non-transitory computer readable medium of claim 10, wherein the encounter history comprises a history of encounters between the mobile communication device and communication devices that come within the range of the mobile communication device.

12. The non-transitory computer readable medium of claim 10, wherein the pseudo identifier includes a hash.

13. The non-transitory computer readable medium of claim 10, wherein the pseudo identifier includes a moniker.

14. The non-transitory computer readable medium of claim 10, wherein the operations further comprise:
sending a query to an intermediary computing device requesting an actual identification of the user of the communication device corresponding to the pseudo identifier provided by the communication device; and
receiving, responsive to a determination by the intermediary computing device that consent rules for providing the actual identification of the user of the communication device are met, the actual identification of the user of the communication device that corresponds with the pseudo identifier provided by the communication device.

15. The non-transitory computer readable medium of claim 10, wherein the operations further comprise:
sending a query to an intermediary computing device requesting contact information for the user of the communication device corresponding to the pseudo identifier provided by the communication device; and
receiving, responsive to a determination by the intermediary computing device that consent rules for providing the contact information for the user of the communication device are met, the contact information for the user of the communication device corresponding to the pseudo identifier provided by the communication device.

16. The non-transitory computer readable medium of claim 10, wherein the operations further comprise:
receiving, from a user of the mobile communication device, a broadcast level;
adjusting, based on the broadcast level received from the user of the mobile communication device, a level of a broadcast transmission power associated with the mobile communication device; and
providing, according to the level of the broadcast transmission power associated with the mobile communication device adjusted based on the broadcast level received from the user of the mobile communication device, an identifier associated with the mobile communication device to communication devices.

17. The non-transitory computer readable medium of claim 10, wherein the environmental data comprises at least one of an ambient temperature of an environment associated with the mobile communication device, a speed associated with the mobile communication device, audio of the environment associated with the mobile communication device, or video of the environment associated with the mobile communication device.

18. The non-transitory computer readable medium of claim 10, wherein the operations further comprise correlating the pseudo identifier provided by the communication device with identifiers provided by other communication devices at the time associated with when the pseudo identifier is received from the communication device.

19. A non-transitory computer readable medium storing instructions that, when executed by a processor of a mobile communication device, cause the processor to perform operations comprising:
receiving a pseudo identifier provided by a communication device within a first range of the mobile communication device, wherein the pseudo identifier is received by the mobile communication device as a result of a broadcast of the pseudo identifier by the communication device, and wherein the pseudo identifier is created by a user of the communication device;
recording location data indicating a location of the mobile communication device at a time associated with when the pseudo identifier is received from the communication device;
correlating the pseudo identifier provided by the communication device with the location data indicating the location of the mobile communication device at the time associated with when the pseudo identifier is received from the communication device to create an encounter history;
receiving, from a user of the mobile communication device, a broadcast level;
adjusting, based on the broadcast level received from the user of the mobile communication device, a level of a broadcast transmission power associated with the mobile communication device; and
providing, according to the level of the broadcast transmission power associated with the mobile communication device adjusted based on the broadcast level received from the user of the mobile communication device, an identifier associated with the mobile communication device to communication devices within a second range of the mobile communication device.

20. The non-transitory computer readable medium of claim 19, wherein the second range is based, at least in part, on the broadcast level received from the user of the mobile communication device.

* * * * *